(12) United States Patent
Yang et al.

(10) Patent No.: US 11,218,936 B2
(45) Date of Patent: Jan. 4, 2022

(54) METHOD AND DEVICE FOR HANDOVER

(71) Applicant: GUANGDONG OPPO MOBILE TELECOMMUNICATIONS CORP., LTD., Guangdong (CN)

(72) Inventors: Ning Yang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 216 days.

(21) Appl. No.: 16/360,513

(22) Filed: Mar. 21, 2019

(65) Prior Publication Data

US 2019/0223071 A1 Jul. 18, 2019

Related U.S. Application Data

(63) Continuation of application No. PCT/CN2016/099723, filed on Sep. 22, 2016.

(51) Int. Cl.
| | |
|---|---|
| *H04W 36/30* | (2009.01) |
| *H04W 52/50* | (2009.01) |
| *H04W 36/00* | (2009.01) |
| *H04B 17/382* | (2015.01) |
| *H04W 52/40* | (2009.01) |
| *H04W 36/08* | (2009.01) |

(52) U.S. Cl.
CPC .......... *H04W 36/30* (2013.01); *H04B 17/382* (2015.01); *H04W 36/0058* (2018.08); *H04W 36/0085* (2018.08); *H04W 52/40* (2013.01); *H04W 52/50* (2013.01); *H04W 36/08* (2013.01)

(58) Field of Classification Search
CPC .......... H04W 36/30; H04W 52/50; H04W 36/0085; H04W 36/0058; H04W 52/40; H04W 36/08; H04W 36/38; H04W 36/3855; H04B 17/382
See application file for complete search history.

(56) References Cited

U.S. PATENT DOCUMENTS

| 7,831,273 B2 * | 11/2010 | Suonvieri | ........... H04W 52/322 |
| | | | 455/522 |
| 2003/0045321 A1 * | 3/2003 | Kim | ........... H04B 17/24 |
| | | | 455/522 |

(Continued)

FOREIGN PATENT DOCUMENTS

| CN | 101483927 | 7/2009 |
| CN | 102217375 | 10/2011 |

(Continued)

OTHER PUBLICATIONS

SIPO, First Office Action for CN Application No. 201680089488.7, dated May 6, 2020.
EPO, Office Action for EP Application No. 16916492.8, dated Apr. 22, 2020.

(Continued)

*Primary Examiner* — Hoang-Chuong Q Vu
(74) *Attorney, Agent, or Firm* — Hodgson Russ LLP

(57) ABSTRACT

The present disclosure relates to a handover method and device. The method includes: receiving, by a network device, a measurement signal transmitted by a terminal device; and determining, by the network device, whether a handover is needed for the terminal device according to the measurement signal.

10 Claims, 5 Drawing Sheets

(56) References Cited

U.S. PATENT DOCUMENTS

| | | | |
|---|---|---|---|
| 2007/0121553 A1* | 5/2007 | Yoon | H04W 52/343 370/335 |
| 2009/0197632 A1* | 8/2009 | Ghosh | H04W 52/34 455/522 |
| 2011/0098054 A1* | 4/2011 | Gorokhov | H04L 5/0035 455/452.1 |
| 2011/0195708 A1 | 8/2011 | Moberg et al. | |
| 2012/0021788 A1* | 1/2012 | Yavuz | H04B 17/24 455/501 |
| 2012/0088507 A1* | 4/2012 | Legg | H04W 36/245 455/436 |
| 2013/0231115 A1* | 9/2013 | Lin | H04W 36/00835 455/436 |
| 2014/0241262 A1 | 8/2014 | Novak et al. | |
| 2014/0247796 A1* | 9/2014 | Ouchi | H04L 5/0053 370/329 |
| 2014/0349654 A1 | 11/2014 | Li | |
| 2015/0181546 A1 | 6/2015 | Freda et al. | |
| 2016/0150445 A1* | 5/2016 | Sandhu | H04W 36/0094 370/331 |
| 2016/0360462 A1* | 12/2016 | Chockalingam | H04W 36/30 |
| 2016/0381607 A1* | 12/2016 | Zhu | H04W 36/0072 370/331 |

FOREIGN PATENT DOCUMENTS

| | | |
|---|---|---|
| CN | 102595528 | 7/2012 |
| CN | 103826270 | 5/2014 |
| CN | 104904268 | 9/2015 |
| JP | 2010522506 | 7/2010 |
| JP | 2013078076 | 4/2013 |
| JP | 2014506097 | 3/2014 |
| JP | 2016504885 | 2/2016 |
| WO | 2016138926 | 9/2016 |

OTHER PUBLICATIONS

EPO, Office Action for EP Application No. 16916492.8, dated Jun. 17, 2019.

Nokia et al., "Considerations on mobility based on UL signals," 3GPP TSG-RAN WG2 Meeting #95, R2-164893, Aug. 2016, 3 pages.

JPO, Office Action for JP Application No. 2019-515881, dated Sep. 29, 2020.

WIPO, ISR for PCT/CN2016/099723, dated Mar. 10, 2017.

India Patent Office, Office Action for IN Application No. 201917015286, dated Jan. 29, 2021.

Taiwan Patent Office, First Office Action for TW Application No. 106129789, dated Dec. 7, 2020.

* cited by examiner

200

Receive, by a network device, a measurement signal transmitted by a terminal device — S210

Determine, by the network device, whether the terminal device needs to perform handover according to the measurement signal — S220

200

Receive, by the network device, a measurement signal transmitted by the terminal device — S210

Obtain, by the network device, information relevant to the measurement signal which is used for indicating information of parameters corresponding to the measurement signal — S230

Determine, by the network device, whether the terminal device needs to perform handover according to the measurement signal — S220

Generate, by the terminal device, the measurement signal — S310

Transmit, by the terminal device, the measurement signal to the network device — S320

FIG. 4

METHOD AND DEVICE FOR HANDOVER

CROSS-REFERENCE TO RELATED APPLICATIONS

This application is a continuation of International Application No. PCT/CN2016/099723 filed on Sep. 22, 2016, the entire disclosure of which is incorporated herein by reference.

TECHNICAL FIELD

Embodiments of the present disclosure relates to the field of communication technologies, and particularly to a handover method and device.

BACKGROUND

In a Long Term Evolution (LTE) system, when a terminal device moves under a connected state, the terminal device performs signal measurement according to the configuration of a base station and the measurement is reported according to the conditions required by the base station. If a handover is needed for the terminal device, the original base station transmits a handover request to the target base station. The handover request includes bearer information for the terminal device to perform handover so as to be switched to the target base station. After the target base station receives the handover request, the target base station confirms the handover request. The target base station transmits the resources required for the handover (such as random access resources which the terminal device uses in the cell which the target base station belongs to) to the terminal device via the current serving cell which the original base station belongs to. After the terminal device receives corresponding messages, the terminal device is then synchronized with the cell which the target base station belongs to, and the handover is completed.

SUMMARY

The present disclosure provides a handover method and device to save signaling overhead of communication systems, and improve utilization of communication resources. With this mechanism, the large signaling overhead for measurement configuration and reporting in legacy mechanism can be avoided.

According to a first aspect, a handover method is provided. The method includes: receiving, by a network device, a measurement signal transmitted by a terminal device; and determining, by the network device, whether a handover is needed for the terminal device according to the measurement signal.

Therefore, in the network device of embodiments of the present disclosure, the network device determines whether the terminal device needs to perform handover according to the measurement signal transmitted by the terminal device. Thus, the network device does not need to perform measurement configuration for the terminal device and the terminal device does not need to feedback the measurement result. The signaling overhead of communication systems is then saved and utilization of communication resources is improved.

With reference to the first aspect, in a first implementation of the first aspect, the method further includes: obtaining, by the network device, information relevant to the measurement signal, wherein the information relevant to the measurement signal is used for indicating information of parameters corresponding to the measurement signal.

wherein determining, by the network device, whether a handover is needed for the terminal device according to the measurement signal, includes:
determining, by the network device, whether the handover is needed for the terminal device according to the measurement signal and the information relevant to the measurement signal.

With reference to the first implementation of the first aspect, in a second implementation of the first aspect, obtaining, by the network device, information relevant to the measurement signal, includes:
receiving, by the network device, the information relevant to the measurement signal transmitted by the terminal device.

With reference to the first implementation or the second implementation of the first aspect, in a third implementation of the first aspect, the information relevant to the measurement signal includes transmitting power information which is used for determining, by the network device, transmitting power of the measurement signal according to the transmitting power information; wherein obtaining, by the network device, information relevant to the measurement signal, includes: obtaining, by the network device, the transmitting power information.

With reference to the third implementation of the first aspect, in a fourth implementation of the first aspect, the transmitting power information includes an absolute value of the transmitting power of the measurement signal; or the transmitting power information includes an offset of the transmitting power of the measurement signal with respect to an initial transmitting power, wherein the initial transmitting power is a power configured by the network device for the terminal device to transmit the measurement signal; or the transmitting power information includes a transmitting power headroom of the terminal device.

With reference to the third implementation or the fourth implementation of the first aspect, in a fifth implementation of the first aspect, obtaining, by the network device, the transmitting power information, includes:
receiving, by the network device, uplink information which is transmitted by the terminal device via an uplink control channel, wherein the uplink information carries the transmitting power information.

With reference to the fifth implementation of the first aspect, in a sixth implementation of the first aspect, a reserved information bit of the uplink information carries the transmitting power information or the transmitting power information is an index value of the transmitting power.

With reference to the third implementation or the fourth implementation of the first aspect, in a seventh implementation of the first aspect, obtaining, by the network device, the transmitting power information, includes:
receiving, by the network device, a Media Access Control (MAC) Control Element (CE) which is transmitted by the terminal device, wherein the MAC CE carries the transmitting power information.

With reference to the third implementation or the fourth implementation of the first aspect, in a eighth implementation of the first aspect, obtaining, by the network device, the transmitting power information, includes:
determining, by the network device, the transmitting power information according a correspondence between the measurement signal or a measurement signal mode and transmitting power of the measurement signal.

With reference to the eighth implementation of the first aspect, in a ninth implementation of the first aspect, determining, by the network device, the transmitting power information according to a correspondence between the measurement signal or a measurement signal mode and transmitting power of the measurement signal, includes:

determining, by the network device, the transmitting power information according to a correspondence between the measurement signal or the measurement signal mode and transmitting power level of the measurement signal.

With reference to the ninth implementation of the first aspect, in a tenth implementation of the first aspect, determining, by the network device, the transmitting power information according to a correspondence between the measurement signal or a measurement signal mode and transmitting power level of the measurement signal, includes:

determining, by the network device, a transmitting port of the measurement signal;

determining, by the network device, the transmitting power information according to a correspondence between a transmitting port and a transmitting power; or determining, by the network device, time-frequency resources corresponding to the measurement signal;

determining, by the network device, the transmitting power information according to a correspondence between time-frequency resources and a transmitting power; or determining, by the network device, a codeword corresponding to the measurement signal;

determining, by the network device, the transmitting power information according to a correspondence between a codeword and a transmitting power.

With reference to any one of the first implementation to the tenth implementation of the first aspect, in an eleventh implementation of the first aspect, determining, by the network device, whether the handover is needed for the terminal device according to the measurement signal and the information relevant to the measurement signal, includes:

determining, by the network device, signal quality of an uplink signal according to the measurement signal and the information relevant to the measurement signal;

determining, by the network device, whether the handover is needed for the terminal device according to the signal quality; or determining, by the network device, whether the handover is needed for the terminal device according to the signal quality and performance of a downlink channel.

With reference to the first aspect or any one of the first implementation to the eleventh implementation of the first aspect, in a twelfth implementation of the first aspect, before receiving, by the network device, the measurement signal transmitted by the terminal device, the method further includes:

transmitting to the terminal device, by the network device, at least one of an initial transmitting power, an index value of a transmitting power, a correspondence between a measurement signal or a measurement signal mode and a transmitting power or a transmitting power level of the measurement signal and a correspondence between transmitting power information and a reserved information bit of uplink information.

With reference to the first aspect or any one of the first implementation to the twelfth implementation of the first aspect, in a thirteenth implementation of the first aspect, the method further includes: transmitting, by the network device, control information to the terminal device, wherein the control information is used for indicating whether the terminal device transmits the measurement signal and/or the information relevant to the measurement signal to the network device.

According to a second aspect, a handover method is provided. The method includes steps of generating, by a terminal device, a measurement signal; and transmitting, by the terminal device, the measurement signal to a network device.

Therefore, according to the handover method of embodiments of the present disclosure, the network device determines whether the terminal device needs to perform handover according to the measurement signal transmitted by the terminal device. Thus, the network device does not need to perform measurement configuration for the terminal device and the terminal device does not need to feedback the measurement result. The signaling overhead of communication systems is then saved and utilization of communication resources is improved.

With reference to the second aspect, in a first implementation of the second aspect, the method further includes: transmitting, by the terminal device, information relevant to the measurement signal, wherein the information relevant to the measurement signal is used for obtaining information of parameters corresponding to the measurement signal.

With reference to the first implementation of the second aspect, in a second implementation of the second aspect, the information relevant to the measurement signal includes transmitting power information which is used for determining, by the network device, transmitting power of the measurement signal according to the transmitting power information.

With reference to the second implementation of the second aspect, in a third implementation of the second aspect, the transmitting power information includes an absolute value of the transmitting power of the measurement signal; or the transmitting power information includes an offset of the transmitting power of the measurement signal with respect to an initial transmitting power, wherein the initial transmitting power is a power configured by the network device for the terminal device to transmit the measurement signal; or the transmitting power information includes a transmitting power headroom of the terminal device.

With reference to the second implementation or the third implementation of the second aspect, in a fourth implementation of the second aspect, transmitting, by the terminal device, information relevant to the measurement signal includes:

transmitting, by the terminal device, uplink information via an uplink control channel, wherein the uplink information carries the transmitting power information.

With reference to the fourth implementation of the second aspect, in a fifth implementation of the second aspect, a reserved information bit of the uplink information carries the transmitting power information or the transmitting power information is an index value of the transmitting power.

With reference to the second implementation or the third implementation of the second aspect, in a sixth implementation of the second aspect, transmitting, by the terminal device, the information relevant to the measurement signal includes:

transmitting, by the terminal device, Medium Access Control (MAC) Control Element (CE) to the network device, wherein the MAC CE carries the transmitting power information.

With reference to the second aspect or the any one of the first implementation to the sixth implementation of the second aspect, in a seventh implementation of the second aspect, the method further includes: receiving, by the terminal device, at least one of an initial transmitting power, an index value of a transmitting power, a correspondence between a measurement signal or a measurement signal mode and a transmitting power or a transmitting power level of the measurement signal and a correspondence between transmitting power information and a reserved information bit of uplink information, which are transmitted by the network device.

With reference to the second aspect or any one of the first implementation to the sixth implementation of the second aspect, in a eighth implementation of the second aspect, the method further includes: receiving, by the terminal device, control information transmitted by the network device, wherein the control information is used for indicating whether the terminal device transmits the measurement signal and/or the information relevant to the measurement signal to the network device;

wherein transmitting, by the terminal device, the measurement signal to the network device includes:

transmitting, by the terminal device, the measurement signal to the network device when the control information indicates the terminal device to transmit the measurement signal to the network device.

According to a third aspect, a network device is provided. The network device is configured to perform the method of the first aspect or any one of the implementations of the first aspect. The network device includes functional modules configured to perform the method of the first aspect or any one of the implementations of the first aspect.

According to a fourth aspect, a network device is provided. The network device is configured to perform the method of the second aspect or any one of the implementations of the second aspect. The network device includes functional modules configured to perform the method of the second aspect or any one of the implementations of the second aspect.

According to a fifth aspect, a network device is provided. The network device includes a processor, a memory and a transceiver which communicate via a bus system. The memory is configured to store instructions. The processor is configured to execute the instructions stored in the memory to control the transceiver to transmit or receive information, which allow the network device to perform the method of the first aspect or any one of the implementations of the first aspect.

According to a sixth aspect, a terminal device is provided. The terminal device includes a processor, memory and a transceiver which communicate via a bus system. The memory is configured to store instructions. The processor is configured to execute the instructions stored in the memory to control the transceiver to transmit or receive information, which allow the terminal device to perform the method of the second aspect or any one of the implementations of the second aspect.

According to a seventh aspect, a computer-readable medium is provided. The computer-readable medium stores computer programs. The computer programs include instructions used for performing the method of the first aspect or any one of implementations of the first aspect.

According to an eighth aspect, a computer-readable medium is provided. The computer-readable medium stores computer programs. The computer programs include instructions used for performing the method of the second aspect or any one of implementations of the second aspect.

BRIEF DESCRIPTION OF THE DRAWINGS

To make the technical solutions in the embodiments of the present disclosure more clear, the following briefly describes the accompanying drawings of the present disclosure. Apparently, the accompanying drawings in the following description show merely some embodiments of the present disclosure, and persons of ordinary skill in the art may still derive other drawings from these accompanying drawings without creative efforts.

FIG. 3 is a schematic flow chart of a handover method according to another embodiment of the present disclosure.

FIG. 4 is a schematic flow chart of a handover method according to another more embodiment of the present disclosure.

DETAILED DESCRIPTION

The technical features of the embodiments of the present disclosure are clearly and completely illustrated as follows with reference to the drawings. The described embodiments are the exemplary embodiments and do not include all of the embodiments. The embodiments obtained, based on the embodiments of the present disclosure, by person of ordinary skill in the art without departing from the inventive scope are within the scope of the present disclosure.

As discussed previously, in related arts, a base station needs to configure a terminal device to perform measurements. The configured terminal device then performs corresponding measurements reporting after measurements are performed. This will result in relatively large signaling overhead.

To address the above problem in related arts, the present disclosure propose solutions as follows.

It should be understood that the technical solutions in the embodiments of the present disclosure can be applied to various communications systems, for example, Global System of Mobile communications (GSM) system, Code Division Multiple Access (CDMA) system, Wideband Code Division Multiple Access (WCDMA) system, General Packet Radio Serving (GPRS) system, Long Term Evolution (LTE) system, Frequency Division Duplex (FDD), Time Division Duplex (TDD), Universal Mobile Telecommunication System (UMTS), Worldwide Interoperability for Microwave Access (WiMAX), fifth-generation mobile communications technology (5G) system and New Radio (NR) system.

In the embodiments of the present disclosure, the terms "network" and "system" are used interchangeably but persons of the ordinary skill in the art can understand the meanings. The terminal device mentioned in the embodiments of the present disclosure includes electronic devices having a wireless communication function. The electronic devices includes handheld devices, automobile electronic devices, wearable devices, computer devices, other processing devices coupled to a wireless modem, User Equipment (UE), Mobile Station (MS), terminal and terminal device. For convenience of description, the mentioned devices are collectively referred to as the terminal devices.

In the embodiments of the present disclosure, the network device is a device communicating with the terminal device. The network device includes an Evolutional Node B (eNB or eNodeB), a relay station, an access point, vehicle-mounted electronic devices, wearable devices, network devices in a future 5G network, and terminal devices in a future evolved public land mobile network (PLMN).

It should be understood that handover refers to that when a UE is in a connected state, if the UE moves between different cells, the UE needs to finish switching and update of the context of the UE by some signaling procedures. The downlink refers to the procedure in which a network device sends information to a terminal device. The uplink refers to the procedure in which the terminal device sends information to the network device.

Figures 1, 2:
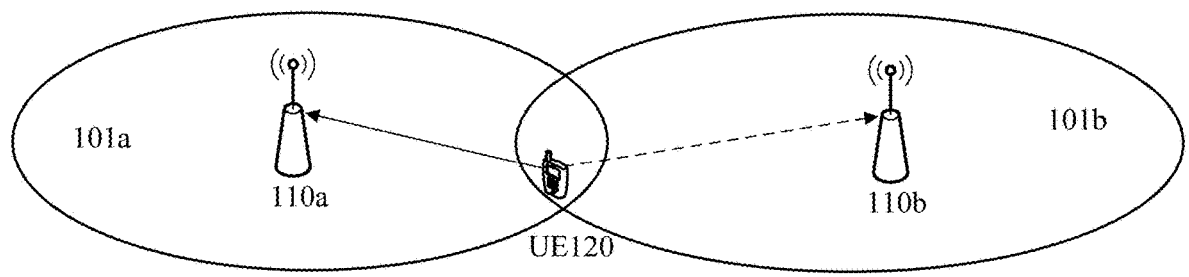
FIG. 1 is a schematic diagram of a communication system performing a communication method according to an embodiment of the present disclosure.
FIG. 2 is a schematic flow chart of a handover method according to an embodiment of the present disclosure.

FIG. 1 is a schematic diagram of a communication system performing communication method according to an embodiment of the present disclosure. The communication system of FIG. 1 includes a source base station 110a for controlling a serving cell 101a, a target base station 110b for controlling a target cell 101b and a UE 120. However, in the present disclosure, the number of the source base station 110a, the target base station 110b and UE 120 in the communication system is not limited.

The serving cell is the current serving cell of the UE 120. A communication link is established between the source base station 110a and the UE 120 and the communication link is currently used for call and/or data transmission.

The source base station 110a transmits a handover command to the UE 120 if it is determined that the UE 120 needs to perform handover from the serving cell to the target cell and the target base station 110b agrees with the handover of the UE 120. The UE 120 initiates a handover from the serving cell 101a to the target cell 101b after receiving the handover command.

The serving cell 101a and the target cell 101b of FIG. 1 belong to different base stations. However, this is only an example and should not be considered as a limitation on the application scenario of the present disclosure. In other examples, the serving cell 101a and the target cell 101b may belong to the same base station.

The following is a handover method according to an embodiment of the present disclosure described in conjunction with the application scenario of FIG. 1. FIG. 2 is a schematic flow chart of a handover method according to an embodiment of the present disclosure. As shown in FIG. 2, the method 200 includes the following steps.

In step S210, a network device receives a measurement signal transmitted by a terminal device.

In step S220, the network device determines whether the terminal device needs to perform handover according to the measurement signal.

Therefore, according to the network device of the embodiment of the present disclosure, the network device determines whether the terminal device needs to perform handover according to the measurement signal. Thus, the network device does not need to perform measurement configuration for the terminal device and the terminal device does not need to report the measurement result. The signaling overhead of communication systems is then saved and utilization of communication resources is improved.

It should be understood that the terminal device may be the UE 120 shown in FIG. 1, and the network device may be the source base station 110a shown in FIG. 1.

In addition, the network device illustrated in the method 200 is a network device corresponding to the serving cell where the terminal device currently resides in. The network device illustrated in the method 200 may also be a network device corresponding to a neighboring cell of the terminal device. The present disclosure does not impose specific limitations on this.

When the network device illustrated in the method 200 is a network device corresponding to the neighboring cell of the terminal device, the network device performs uplink time synchronization according to the received measurement signal, and determines signal quality of the neighboring cell of the terminal device.

In one embodiment of the present disclosure, the network device determines, according to the measurement signal, whether the terminal device needs to perform handover. It can be understood that the measurement signal is a signal used by the network device to measure the link quality of the terminal device.

In one embodiment of the present disclosure, the measurement signal is specifically defined as a dedicated signal used by the network device to determine whether the terminal device needs to perform handover. In other embodiments of the present disclosure, the measurement signal is not specifically defined as a dedicated signal for the network device to determine whether the terminal device needs to performs handover. For example, the measurement signal may be an uplink Sounding Reference Signal (SRS).

Optionally, in another embodiment of the present disclosure, the measurement signal is a code word, and the present disclosure does not limit the specific form of the code word.

In the above embodiments, optionally, via the high layer signaling or physical layer signaling, the network device notifies the terminal device to periodically or non-periodically transmit the measurement signal. The terminal device then periodically transmits the measurement signal to the network device or non-periodically transmits the measurement signal to the network device, according to the configuration of the network device.

In one embodiment of the present disclosure, optionally, as shown in FIG. 3, the method 200 further includes the step S230. In the step S230, the network device obtains information relevant to the measurement signal which is used for indicating information of parameters corresponding to the measurement signal.

When the network device determines whether the terminal device needs to perform handover, the network device determines whether the terminal device needs to perform handover according to the information relevant to the measurement signal.

Optionally, as an exemplary embodiment, the measurement signal transmitted by the terminal device is received by the network device.

Furthermore, the network device transmits control information to the terminal device. The control information is used for indicating whether the terminal device transmits the measurement signal and/or the information relevant to the measurement signal. When the control information indicates that the terminal device transmits the measurement signal and/or the information relevant to the measurement signal to the network, the terminal device transmits the measurement signal and/or the information relevant to the measurement signal. Optionally, the network device transmits control information to the terminal device by using dedicated control signaling of the terminal device.

In the mentioned embodiments, optionally, the information relevant to the measurement signal includes transmitting power information. The transmitting power information is used for determining, by the network device, transmitting power of the measurement signal according to the transmitting power information.

Specifically, the transmitting power information includes an absolute value of the transmitting power of the measurement signal, or the transmitting power information includes an offset of the transmitting power of the measurement signal with respect an initial transmitting power. The initial transmitting power is a power configured by the network device for the terminal device to transmit the measurement signal. Or, the transmitting power information includes transmitting power headroom of the terminal device.

Optionally, it should be understood that the transmitting power information is used for indicating the absolute value of the transmitting power of the measurement signal. For example, the transmitting power information indicates the transmitting power of the measurement signal as 20 dBm. Or, the transmitting power information indicates the offset between the transmitting power of the measurement signal and the initial transmitting power. For example, the initial transmitting power of the terminal device configured by the network device is 20 dBm. When the transmitting power information indicates an offset of 5 dBm, the network determines that the transmitting power when the terminal device sends the measurement signal is 15 dBm according to the transmitting power information.

In embodiments of the present disclosure, optionally, the terminal device transmits the uplink information to the network device via an uplink control channel. The uplink information carries the transmitting power information.

It is understood that, optionally, the uplink control channel may a Physical Uplink Control Channel (PUCCH) or a Physical Uplink Shared Channel (PUSCH).

Specifically, a reserved information bit may be introduced into the uplink information transmitted via the uplink control channel. The reserved information bit indicates the absolute value of the transmitting power and/or the transmitting power headroom. For example, a correspondence of the bit number of the reserved information bit and the absolute value of the transmitting power and/or the transmitting power headroom may be set in advance. The network device determines the absolute value of the transmitting power and/or the transmitting power headroom according to the bit number of the reserved information bit.

Optionally, the absolute value of the transmitting power and/or the transmitting power headroom may be directly carried in the uplink information transmitted via the uplink control channel. The network device directly determines the absolute value of the transmitting power and/or the transmitting power headroom carried in the uplink information.

Optionally, a transmitting power index value is introduced in the uplink information transmitted via the uplink control channel. The correspondence between the transmitting power index value and the absolute value of the transmitting power and/or the transmitting power headroom is configured in the network device and the terminal device in advance. The network device determines the absolute value of the transmitting power and/or the transmitting power headroom according to the correspondence and the transmitting power index value in the uplink information.

Optionally, in another embodiment of the present disclosure, the network device receives Medium Access Control (MAC) Control Element (CE). The MAC CE carries the transmitting power index value, and the absolute value of the transmitting power and/or the transmitting power headroom, and so on.

In one embodiment of the present disclosure, optionally, the network device determines the transmitting power information according to the correspondence between transmitting power and measurement signal and/or the modes of the measurement signal.

Specifically, the network device determines the transmitting power information according to the correspondence between the transmitting power level and the measurement signal or the mode of the measurement signal. The transmitting power level may be specifically corresponding to the absolute value of the transmitting power. The transmitting power level may also be corresponding to the offset of the transmitting power with respect to the initial transmitting power.

For example, if the measurement signal is SRS1, the corresponding transmitting power level is level 1. If the measurement signal is SRS2, the corresponding transmitting power level is level 2. Optionally, the occupied sub-frames for transmitting SRS1 and SRS2 by the terminal device are not identical.

Moreover, the transmitting power levels may be classified in a space division manner. For example, an antenna port 1 corresponds to a power level 1, an antenna port 2 corresponds to a power level 2. After the transmit port for transmitting the measurement signal is determined by the network device, the absolute value of the transmitting power and/or the offset of the transmitting power with respect to the initial transmitting power can be determined by the network device according to the correspondence of the antenna ports and the power levels.

Optionally, the transmitting power levels may be classified according to the time-frequency resources. For example, a time-frequency resource block 1 corresponds to a power level 1, a time-frequency resource block 2 corresponds to a power level 2. After the time frequency resource block for transmitting the measurement signal is determined by the network device, the absolute value of the transmitting power and/or the offset of the transmitting power with respect to the initial transmitting power can be determined by the network device according to the correspondence between the time-frequency resource blocks and the power levels.

Optionally, the transmitting power levels may be classified according to the code words. For example, a code word 1 is corresponds to a power level 1, and a code word 2 corresponds to a power level 2. After the code word corresponding to the measurement channel is determined by the network device, the absolute value of the transmitting power and/or the offset of the transmitting power with respect to the initial transmitting power can be determined by the network device according to the correspondence of the code words and the power levels.

In the mentioned embodiments, optionally, when the network device determines whether the terminal device needs to perform handover according to the measurement signal and the information relevant to the measurement signal, the network determines the signal quality of the uplink signal according to the measurement signal and the information relevant to the measurement signal. The network device then determines whether the terminal device needs to perform handover according to the determined signal quality.

Specifically, the network device determines the uplink path loss condition according to the measurement signal and the transmitting power information. The signal quality of the uplink signal of the current serving cell of the terminal device can be determined according to the uplink path loss condition. The network device determines whether the terminal device needs to perform handover according to the signal quality of the uplink signal of the current serving cell and the signal quality of the uplink signal of the neighboring cell.

For example, when the network device determines that the signal strength of the uplink signal of the current serving cell is lower than a first pre-defined threshold, the network device determines that the terminal device needs to perform handover. Optionally, when the network device determines that the signal strength of the uplink signal of the current serving cell is lower than a second threshold and the signal strength of the uplink signal of neighboring cell is greater than a third threshold, the network device determines that the terminal device needs to perform handover. Optionally, the second threshold may be equal to the third threshold. Optionally, when the difference of the signal strength of the uplink signal of the current serving cell and the signal strength of the uplink signal of neighboring cell is determined as greater than a fourth threshold, the network device determines that the terminal device needs to perform handover.

Moreover, after the signal quality of the uplink signal of the current serving cell of the terminal device is determined by the network device, the network device then determines whether the terminal device needs to perform handover according to the determined signal quality and the performance of the downlink channel.

For example, when the network device determines that the signal strength of the uplink signal of the current serving cell is smaller than the first pre-defined threshold and the bit error rate of the current downlink channel of the terminal device is greater than the second pre-defined threshold, the network device determines the terminal device needs to perform handover. Optionally, when the network device determines that the signal strength of the uplink signal of the current serving cell is smaller than the second threshold, the signal strength of the uplink signal of the neighboring cell is greater than the third threshold, and the bit error rate of the current downlink channel of the terminal device is greater than the fourth pre-defined threshold, the network device determines that the terminal device needs to perform handover. Optionally, when the network device determines that the difference between the signal strength of the uplink signal of the current serving cell and the signal strength of the uplink signal of the neighboring cell is greater than the fourth threshold and the bit error rate of the current downlink channel of the terminal device is greater than the fifth pre-defined threshold, the network device determines that the terminal device needs to perform handover. Optionally, when the network device determines that the signal strength of the uplink signal of the current serving cell is greater than the sixth pre-defined threshold and the bit error rate of the current downlink channel of the terminal device is greater than the sixth pre-defined threshold, the network device determines that the terminal device needs to perform handover.

In the above embodiments, optionally, before the network device receives the measurement signal transmitted by the terminal device, the network device transmit to the terminal device at least one of an initial transmitting power, an index value of a transmitting power, a correspondence between a measurement signal or a measurement signal mode and a transmitting power level, and a correspondence between transmitting power information and a reserved information bit of uplink information. Further, the network device sends the above information to the terminal device via dedicated signaling of the terminal device.

In the mentioned embodiments, optionally, when the network device determines that the terminal device needs to perform handover, the network device sends a handover request to a target network device, the target network device confirms the request. The target base station transmits the resources required for the handover to the terminal device, and then the terminal device is synchronized with the cell which the target base station belongs to.

Figure 5:
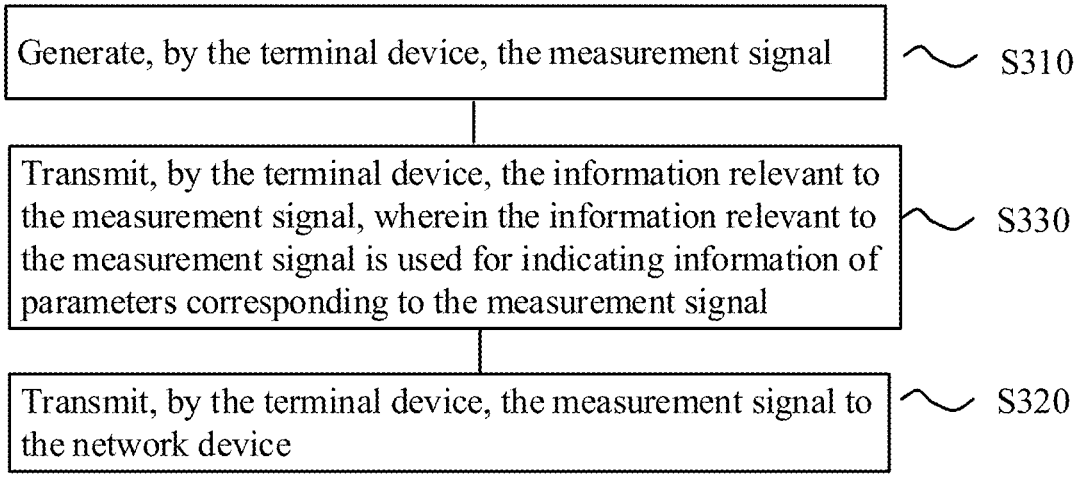
FIG. 5 is a schematic flow chart of a handover method according to another more embodiment of the present disclosure.

As shown in FIGS. 2 and 3, the handover method according to embodiments of the present disclosure is illustrated in details from the network device side. As shown in FIGS. 4 and 5, a handover method according to embodiments of the present disclosure is illustrated in details from the terminal device side. It should be understood that the interactions between the terminal device and the network device, the relevant features and functions described from the network device side are corresponding to those described from the terminal device side. For the purpose of conciseness, repeated descriptions are omitted. As shown in FIG. 4, the method 300 includes the following steps.

In step S310, a terminal device generates a measurement signal.

In step S320, the terminal device transmits the measurement signal to the terminal device.

Therefore, according the handover method of the embodiment of the present disclosure, the terminal device transmits the measurement signal to the network device. The network device then determines whether the terminal device needs to perform handover according to the measurement signal transmitted by the terminal device. Thus, the network device does not need to perform measurement configuration for the terminal device and the terminal device does not need to feedback the measurement result. The signaling overhead of communication systems is then saved and utilization of communication resources is improved.

In one embodiment of the present disclosure, optionally, as shown in FIG. 5, the method 300 further includes the following step.

In step S330, the terminal device transmits information relevant to the measurement signal to the network device. The information relevant to the measurement signal is used for obtaining information of parameters corresponding to the measurement signal.

In one embodiment of the present disclosure, optionally, the information relevant to the measurement signal includes transmitting power information, and the transmitting power information is used for determining transmitting power of the measurement signal according the transmitting power information by the network device.

In one embodiment of the present disclosure, optionally, the transmitting power information includes an absolute value of the transmitting power of the measurement signal, or the transmitting power information includes an offset of the transmitting power of the measurement signal with respect to an initial transmitting power. The initial transmitting power is a power configured by the network device for the terminal device to transmit the measurement signal. Or, the transmitting power information includes a transmitting power headroom of the terminal device.

In one embodiment of the present disclosure, optionally, transmitting, by the terminal device, information relevant to the measurement signal to the network device includes: transmitting, by the terminal device, uplink information via an uplink control channel. The uplink information carries the transmitting power information.

In one embodiment of the present disclosure, optionally, a reserved information bit of the uplink information carries the transmitting power information or the transmitting power information is an index value of the transmitting power.

In one embodiment of the present disclosure, optionally, transmitting, by the terminal device, the information relevant to the measurement signal to the network device includes: transmitting, by the terminal device, MAC CE to the network device. The MAC CE carries the transmitting power information.

In one embodiment of the present disclosure, optionally, the method further includes: receiving, by the terminal device, at least one of an initial transmitting power, an index value of a transmitting power, a correspondence between a measurement signal or a measurement signal mode and a transmitting power or a transmitting power level of the measurement signal, and a correspondence between transmitting power information and a reserved information bit of uplink information, which are transmitted by the network device.

In one embodiment of the present disclosure, optionally, the method further includes: receiving, by the terminal device, control information transmitted by the network device, wherein the control information is used for indicating whether the terminal device transmits the measurement signal and/or the information relevant to the measurement signal to the network device.

According to an embodiment, transmitting, by the terminal device, the measurement signal to the network device includes:

transmitting, by the terminal device, the measurement signal to the network device when the control information indicates the terminal device to transmit the measurement signal to the network device.

Therefore, according the handover method of embodiments of the present disclosure, the terminal device transmits the measurement signal to the network device. The network device determines whether the terminal device needs to perform handover according to the measurement signal transmitted by the terminal device. Thus, the network device does not need to perform measurement configuration for the terminal device and the terminal device does not need to feedback the measurement result. The signaling overhead of communication systems is then saved and utilization of communication resources is improved.

Figure 6:
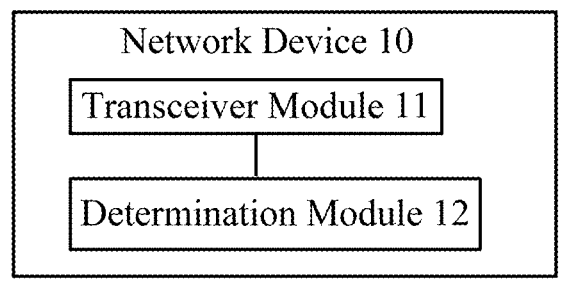
FIG. 6 is a schematic block diagram of a network device according to another embodiment of the present disclosure.

As shown in FIGS. 4 and 5, the handover method of embodiments of the present disclosure is illustrated in details. As shown in FIG. 6, a network device according to an embodiment of the present disclosure is illustrated in details.

FIG. 6 is a schematic block diagram of a network device according to one embodiment of the present disclosure. As shown in FIG. 6, the network device 10 includes a transceiver module 11 and a determination module 12.

The transceiver module 11 is configured to receive a measurement signal transmitted by a terminal device.

The determination module 12 is configured to determine whether a handover is needed for the terminal device according to the measurement signal.

Therefore, according to the network device of the embodiment of the present disclosure, the network device determines whether the terminal device needs to perform handover according to the measurement signal transmitted by the terminal device. Thus, the network device does not need to perform measurement configuration for the terminal device and the terminal device does not need to feedback the measurement result. The signaling overhead of communication systems is then saved and utilization of communication resources is improved.

In one embodiment of the present disclosure, optionally, the determination module 12 is further configured to obtain information relevant to the measurement signal, wherein the information relevant to the measurement signal is used for obtaining information of parameters corresponding to the measurement signal.

The determination module 12 is configured to determine whether the handover is needed for the terminal device according to the measurement signal and the information relevant to the measurement signal when the determination module 12 determines whether the handover is needed for the terminal device according to the measurement signal.

In one embodiment of the present disclosure, optionally, the transceiver module 11 is further configured to receive information relevant to the measurement signal transmitted by the terminal device.

In one embodiment of the present disclosure, optionally, the information relevant to the measurement signal includes transmitting power information which is used for determining, by the network device, transmitting power of the measurement signal according to the transmitting power information.

The determination module 12 is configured to obtain the transmitting power information.

In one embodiment of the present disclosure, optionally, the transmitting power information includes an absolute value of the transmitting power of the measurement signal; or the transmitting power information includes an offset of the transmitting power of the measurement signal with respect to an initial transmitting power, wherein the initial transmitting power is a power configured by the network device for the terminal device to transmit the measurement signal; or the transmitting power information includes a transmitting power headroom of the terminal device.

In one embodiment of the present disclosure, optionally, the transceiver module 11 is configured to: receive uplink information which is transmitted by the terminal device via an uplink control channel, wherein the uplink information carries the transmitting power information.

In one embodiment of the present disclosure, optionally, a reserved information bit of the uplink information carries the transmitting power information or the transmitting power information is an index value of the transmitting power.

In one embodiment of the present disclosure, optionally, the transceiver module 11 is configured to receive MAC CE transmitted by the terminal device and the MAC CE carries the transmitting power information.

In one embodiment of the present disclosure, optionally, the determination module 12 is configured to determine the transmitting power information according to a correspondence between the measurement signal or a measurement signal mode and transmitting power of the measurement signal.

In one embodiment of the present disclosure, optionally, the determination module 12 is configured to determine the transmitting power information according to a correspondence between the measurement signal or the measurement signal mode and transmitting power level of the measurement signal.

In one embodiment of the present disclosure, optionally, the determination module 12 is configured to:

determine a transmitting port of the measurement signal;

determine the transmitting power information according to a correspondence between a transmitting port and a transmitting power; or determine time-frequency resources corresponding to the measurement signal;

determine the transmitting power information according to a correspondence between time-frequency resources and a transmitting power; or determine a code word corresponding to the measurement signal;

determine the transmitting power information according to a correspondence between a code word and a transmitting power.

In one embodiment of the present disclosure, optionally, the determination module 12 is configured to:

determine signal quality of an uplink signal according to the measurement signal and the information relevant to the measurement signal;

determine whether the handover is needed for the terminal device according to the signal quality; or determine whether the handover is needed for the terminal device according to the signal quality and performance of a downlink channel.

In one embodiment of the present disclosure, optionally, the transceiver module 11 is further configured to: before the transceiver module receives the measurement signal transmitted by the terminal device, transmit at least one of an initial transmitting power, an index value of a transmitting power, a correspondence between a measurement signal or a measurement signal mode and a transmitting power or a transmitting power level of the measurement signal, and a correspondence between transmitting power information and a reserved information bit of uplink information.

In one embodiment of the present disclosure, optionally, the transceiver module 11 is further configured to: transmit control information to the terminal device, wherein the control information is used for indicating whether the terminal device transmits the measurement signal and/or the information relevant to the measurement signal to the network device.

The handover method 200 of embodiments of the present disclosure is implemented by the network device provided by embodiments of the present disclosure and the procedures of the method 200 are respectively implemented by the units/modules of the network device and the mentioned operations and/or functions are not repeated here.

Therefore, according to the network device, the network device determines whether the terminal device needs to perform handover according to the measurement signal transmitted by the terminal device. Thus, the network device does not need to perform measurement configuration for the terminal device and the terminal device does not need to feedback the measurement result. The signaling overhead of communication systems is then saved and utilization of communication resources is improved.

Figure 7:
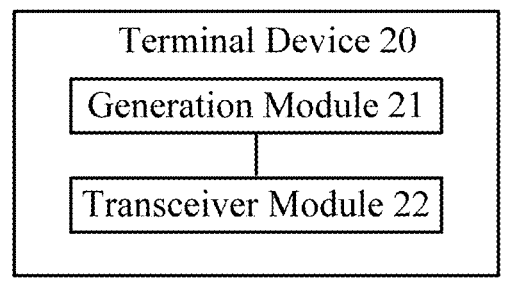
FIG. 7 is a schematic block diagram of a terminal device according to another embodiment of the present disclosure.

FIG. 7 is a schematic block diagram of a terminal device according to one embodiment of the present disclosure. As shown in FIG. 7, the terminal device 20 includes a generation module 21 and a transceiver module 22.

The generation module 21 is configured to generate a measurement signal.

The transceiver module 22 is configured to transmit the measurement signal to a network device.

Therefore, the terminal device transmits the measurement signal to the network device, so that the network device can determine whether the terminal device needs to perform handover. Thus, the network device does not need to perform measurement configuration for the terminal device and the terminal device does not need to feedback the measurement result. The signaling overhead of communication systems is then saved and utilization of communication resources is improved.

In one embodiment of the present disclosure, optionally, the transceiver module 22 is configured to transmit information relevant to the measurement signal, wherein the information relevant to the measurement signal is used for obtaining information of parameters corresponding to the measurement signal.

In one embodiment of the present disclosure, optionally, the information relevant to the measurement signal includes transmitting power information which is used for determining, by the network device, transmitting power of the measurement signal according to the transmitting power information.

In one embodiment of the present disclosure, optionally, the transmitting power information includes an absolute value of the transmitting power of the measurement signal; or the transmitting power information includes an offset of the transmitting power of the measurement signal with respect to an initial transmitting power, wherein the initial transmitting power is a power configured by the network device for the terminal device to transmit the measurement signal; or the transmitting power information includes a transmitting power headroom of the terminal device.

In one embodiment of the present disclosure, optionally, the transceiver module 21 is further configured to: transmit uplink information via an uplink control channel, wherein the uplink information carries the transmitting power information.

In one embodiment of the present disclosure, optionally, a reserved information bit of the uplink information carries the transmitting power information or the transmitting power information is an index value of the transmitting power.

In one embodiment of the present disclosure, optionally, the transceiver module 21 is configured to transmit MAC CE to the network device and the MAC CE carries the transmitting power information.

In one embodiment of the present disclosure, optionally, the transceiver module is further configured to: receiving, by the terminal device, at least one of an initial transmitting power, an index value of a transmitting power, a correspondence between a measurement signal or a measurement signal mode and a transmitting power or a transmitting power level of the measurement signal, and a correspondence between transmitting power information and a reserved information bit of uplink information, which are transmitted by the network device.

In one embodiment of the present disclosure, optionally, the transceiver module is further configured to receive control information transmitted by the network device, wherein the control information is used for indicating whether the terminal device transmits the measurement signal and/or the information relevant to the measurement signal to the network device.

The transceiver module 21 is configured to transmit the measurement signal to the network device when the control information indicates the terminal device to transmit the measurement signal to the network device if the transceiver module transmits the measurement signal to the network device.

The handover method 300 of embodiments of the present disclosure is implemented by the terminal device of embodiments of the present disclosure and the procedures of the method 300 are respectively implemented by the units/modules of the terminal device and the mentioned operations and/or functions are not repeated here.

Therefore, the terminal device transmits the measurement signal to the network device and the network device determines whether the terminal device needs to perform handover. Thus, the network device does not need to perform measurement configuration for the terminal device and the terminal device does not need to feedback the measurement result. The signaling overhead of communication systems is then saved and utilization of communication resources is improved.

Figure 8:
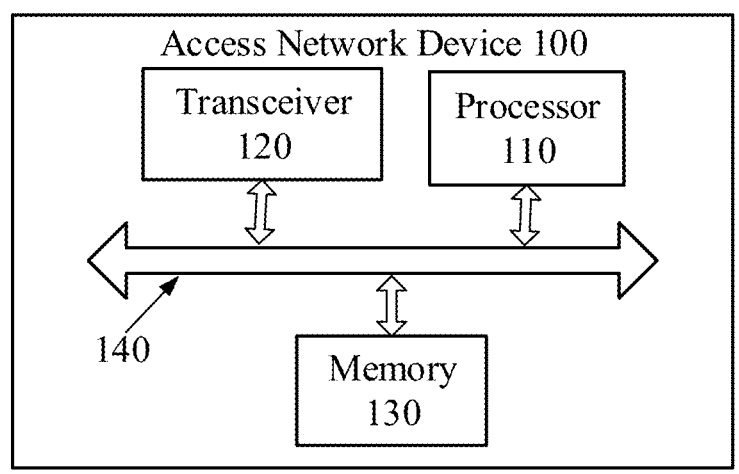
FIG. 8 is a schematic block diagram of a network device according to another embodiment of the present disclosure.

FIG. 8 is a schematic block diagram of a network device according to another embodiment of the present disclosure. As shown in FIG. 8, the access network device 100 includes a processor 110 and a transceiver 120. The processor 110 is coupled to the transceiver 120. Optionally, the network device further includes a memory 130. The memory 130 is coupled to the processor 110. Furthermore, optionally, the network device 100 includes a bus system 140. The processor 110, the memory 130 and the transceiver 120 communicate with each other via the bus system 140. The memory 130 is configured to store instructions. The processor 110 is configured to execute the instructions stored in the memory 130 to control the transceiver 120 to transmit or receive information. The transceiver 120 is configured to receive the measurement signal transmitted by the terminal device. The processor 110 is configured to determine whether the terminal device needs to perform handover according to the measurement signal.

Therefore, according to the network device of one embodiment of the present disclosure, the network device determines whether the terminal device needs to perform handover according to the measurement signal transmitted by the terminal device. Thus, the network device does not need to perform measurement configuration for the terminal device and the terminal device does not need to feedback the measurement result. The signaling overhead of communication systems is then saved and utilization of communication resources is improved.

It should be understood that, in one embodiment of the present disclosure, the processor 110 may be a Central Processing Unit (CPU). The processor 110 may also be other general purpose processors, Digital Signal Processor (DSP), Application Specific Integrated Circuit (ASIC), Field Programmable Gate Array (FPGA) or other programmable logic device, discrete gate or transistor de vice, discrete hardware components and the like. The general purpose processors may be micro-processors or conventional processors.

The memory 130 may include a read only memory and a random access memory, and the memory 130 provides instructions and data to the processor 110.

A portion of the memory 130 includes a non-volatile random access memory, e.g. the memory 130 can store information of device type.

The bus system 130 includes a data bus, and may further include a power bus, a control bus and a state signal bus, and the like. For clarity, various buses are labeled as bus system 130 in the figures.

In the implementations, each step of the mentioned methods may be implemented by an integrated hardware logic circuit of the processor 110 or instructions in a software form. The steps of methods disclosed in the present disclosure may be executed by a hardware processor or may be executed by a combination of hardware and software modules of a processor. The software modules may be located in a random storage medium, such as a flash memory, a read only memory, a programmable read only memory or an electrically erasable programmable memory, a register and other storage medium known in this art. The storage medium resides in the memory 130. The processor 110 reads the information in the memory 130 and performs the steps of the mentioned methods in combination with the hardware. Repeated descriptions are omitted here.

Optionally, in one embodiment, the processor 110 is further configured to: obtain information relevant to the measurement signal, wherein the information relevant to the measurement signal is used for obtaining information of parameters corresponding to the measurement signal.

When the network device determines whether the terminal device needs to perform handover according to the measurement signal, the processor 110 is configured to determine whether the terminal device needs to perform handover according to the measurement signal and the information relevant to the measurement signal.

Optionally, in one embodiment, the transceiver 120 is further configured to receive information relevant to the measurement signal transmitted by the terminal device.

Optionally, in one embodiment, the information relevant to the measurement signal includes transmitting power information which is used for determining, by the network device, transmitting power of the measurement signal according to the transmitting power information.

The processor 110 is configured to obtain the transmitting power information.

Optionally, in one embodiment, the transmitting power information includes an absolute value of the transmitting power of the measurement signal; or the transmitting power information includes an offset of the transmitting power of the measurement signal with respect to an initial transmitting power, wherein the initial transmitting power is a power configured by the network device for the terminal device to transmit the measurement signal; or the transmitting power information includes a transmitting power headroom of the terminal device.

Optionally, in one embodiment, the transceiver 120 is configured to receive uplink information which is transmitted by the terminal device via an uplink control channel, wherein the uplink information carries the transmitting power information.

Optionally, in one embodiment, a reserved information bit of the uplink information carries the transmitting power information or the transmitting power information is an index value of the transmitting power.

Optionally, in one embodiment, the transceiver 120 is configured to the transceiver module is configured to receive a Media Access Control (MAC) Control Element (CE) which is transmitted by the terminal device, wherein the MAC CE carries the transmitting power information.

Optionally, in one embodiment, the processor 110 is configured to determine the transmitting power information according to a correspondence between the measurement signal or a measurement signal mode and transmitting power of the measurement signal.

Optionally, in one embodiment, the processor 110 is configured to determine the transmitting power information according to a correspondence between the measurement signal or the measurement signal mode and transmitting power level of the measurement signal.

Optionally, in one embodiment, the processor 110 is configured to: determine a transmitting port of the measurement signal;

determine the transmitting power information according to a correspondence between a transmitting port and a transmitting power; or determine time-frequency resources corresponding to the measurement signal;

determine the transmitting power information according to a correspondence between time-frequency resources and a transmitting power; or determine a code word corresponding to the measurement signal;

determine the transmitting power information according to a correspondence between a code word and a transmitting power.

Optionally, in one embodiment, the processor 110 is configured to: determine signal quality of an uplink signal according to the measurement signal and the information relevant to the measurement signal;

determine whether the handover is needed for the terminal device according to the signal quality; or determine whether the handover is needed for the terminal device according to the signal quality and performance of a downlink channel.

Optionally, in one embodiment, the transceiver 120 is further configured to: before the transceiver 120 receives the measurement signal transmitted by the terminal device, the transceiver 120 is further configured to: transmit to the terminal device at least one of an initial transmitting power, an index value of a transmitting power, a correspondence between a measurement signal or a measurement signal mode and a transmitting power or a transmitting power level of the measurement signal, and a correspondence between transmitting power information and a reserved information bit of uplink information.

Optionally, in one embodiment, the transceiver 120 is further configured to: transmit control information to the terminal device, wherein the control information is used for indicating whether the terminal device transmits the measurement signal and/or the information relevant to the measurement signal to the network device.

The handover method 200 of embodiments of the present disclosure is implemented by the network device of embodiments of the present disclosure and the procedures of the method 200 are respectively implemented by the units/modules of the terminal device, and details of the operations and/or functions are not repeated here.

Therefore, according to the network device of embodiments of the present disclosure, the network device determines whether the terminal device needs to perform handover according to the measurement signal transmitted by the terminal device. Thus, the network device does not need to perform measurement configuration for the terminal device and the terminal device does not need to feedback the measurement result. The signaling overhead of communication systems is then saved and utilization of communication resources is improved.

Figure 9:
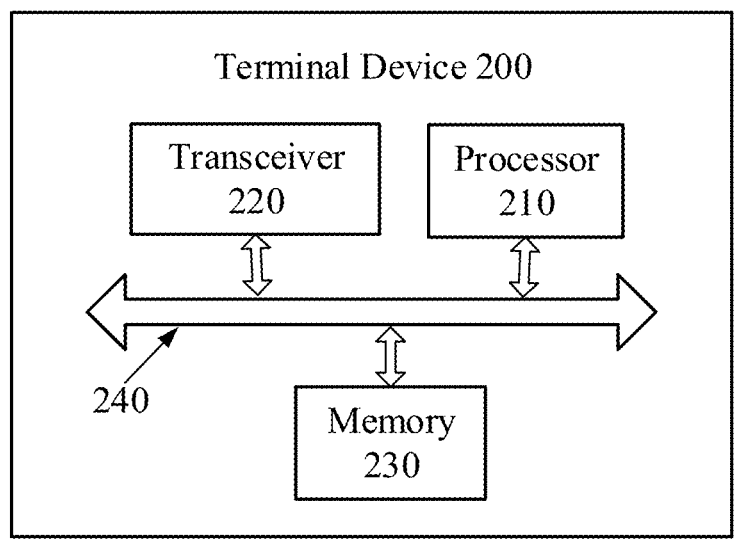
FIG. 9 is a schematic block diagram of a network device according to another embodiment of the present disclosure.

FIG. 9 is a schematic block diagram of a network device according to another embodiment of the present disclosure. As shown in FIG. 9, the terminal device 200 includes a processor 210 and a transceiver 220. The processor 210 is coupled to the transceiver 220. Optionally, the network device further includes a memory 230. The memory 130 is coupled to the processor 210. Furthermore, optionally, the network device 200 includes a bus system 240. The processor 210, the memory 230 and the transceiver 220 communicate with each other via the bus system 240. The memory 230 is configured to store instructions. The processor 210 is configured to execute the instructions stored in the memory 230 to control the transceiver 220 to transmit or receive information. The processor 110 is configured to generate the measurement signal. The transceiver 220 is configured to send the measurement signal to the network device.

Therefore, according to the terminal device of embodiments of the present disclosure, the network device determines whether the terminal device needs to perform handover according to the measurement signal transmitted by the terminal device. Thus, the network device does not need to perform measurement configuration of the terminal device and the terminal device does not need to feedback the measurement result. The signaling overhead of communication systems is then saved and utilization of communication resources is improved.

It should be understood that, in one embodiment of the present disclosure, the processor 210 may be a Central Processing Unit (CPU). The processor 210 may also be other general purpose processors, Digital Signal Processor (DSP), Application Specific Integrated Circuit (ASIC), Field Programmable Gate Array (FPGA) or other programmable logic device, discrete gate or transistor de vice, discrete hardware components and the like. The general purpose processors may be micro-processors or conventional processors.

The memory 230 may include a read only memory and a random access memory, and the memory 230 provides instructions and data to the processor 210.

A portion of the memory 230 includes a non-volatile random access memory, e.g. the memory 230 can store information of device type.

The bus system 230 includes a data bus, and may further include a power bus, a control bus and a state signal bus, and the like. For clarity, various buses are labeled as bus system 230 in the figures.

In the implementations, each step of the mentioned methods may be implemented by an integrated hardware logic circuit of the processor 210 or instructions in a software form. The steps of methods disclosed in the present disclosure may be executed by a hardware processor or may be executed by a combination of hardware and software modules of a processor. The software modules may be located in a random storage medium, such as a flash memory, a read only memory, a programmable read only memory or an electrically erasable programmable memory, a register and other storage medium known in this art. The storage medium resides in the memory 230. The processor 210 reads the information in the memory 230 and performs the steps of the mentioned methods in combination with the hardware. Repeated descriptions are omitted here.

Optionally, in one embodiment, the transceiver 220 is further configured to transmit information relevant to the measurement signal, wherein the information relevant to the measurement signal is used for obtaining information of parameters corresponding to the measurement signal.

Optionally, in one embodiment, the information relevant to the measurement signal includes transmitting power information and the transmitting power information is used to determine, by the network device, a transmitting power of the measurement signal according the transmitting power information.

Optionally, in one embodiment, the transmitting power information includes an absolute value of the transmitting power of the measurement signal; or the transmitting power information includes an offset of the transmitting power of the measurement signal with respect to an initial transmitting power, wherein the initial transmitting power is a power configured by the network device for the terminal device to transmit the measurement signal; or the transmitting power information includes a transmitting power headroom of the terminal device.

Optionally, in one embodiment, the transceiver 220 is configured to transmit uplink information via an uplink control channel and the uplink information carries the transmitting power information.

Optionally, in one embodiment, a reserved information bit of the uplink information carries the transmitting power information or the transmitting power information is an index value of the transmitting power.

Optionally, in one embodiment, the transceiver 220 is configured to transmit MAC CE to the network device and the MAC CE carries the transmitting power information.

Optionally, in one embodiment, the transceiver 220 is configured to: receive at least one of an initial transmitting power, an index value of a transmitting power, a correspondence between a measurement signal or a measurement signal mode and a transmitting power or a transmitting power level of the measurement signal, and a correspondence between transmitting power information and a reserved information bit of uplink information, which are transmitted by the network device Optionally, in one embodiment, the transceiver 220 is configured to receive control information transmitted by the network device, wherein the control information is used for indicating whether the terminal device transmits the measurement signal and/or the information relevant to the measurement signal to the network device.

Optionally, in one embodiment, the transceiver 220 is configured to transmit the measurement signal to the network device when the control information indicates the terminal device to transmit the measurement signal to the network device.

The handover method 300 of embodiments of the present disclosure is implemented by the network device of embodiments of the present disclosure and the procedures of the method 300 are respectively implemented by the units/modules of the terminal device. Details of the operations and/or functions are omitted here.

Therefore, according to the terminal device of embodiments of the present disclosure, the terminal device transmits the measurement signal to the network device. The network device then determines whether the terminal device needs to perform handover according to the measurement signal transmitted by the terminal device. Thus, the network device does not need to perform measurement configuration of the terminal device and the terminal device does not need to feedback the measurement result. The signaling overhead of communication systems is then saved and utilization of communication resources is improved.

It should be understood that the term "one embodiment" or "an embodiment" as used throughout the specification means that a particular feature, structure or characteristic relating to an embodiment is included in at least one embodiment of the disclosure. Thus, "in one embodiment" or "in an embodiment" as used throughout the specification does not necessarily refer to the same embodiment. In addition, these particular features, structures, or characteristics may be combined in any suitable manner in one or more embodiments.

It should be understood that the term "and/or" in this context is merely an association describing the associated objects, indicating that there may be three relationships. For example, "A and/or B" may indicate that A exists alone, and A and B exist simultaneously, and A exists alone. In addition, the character "/" herein generally indicates that the objects before or after the character "/" have an "or" relationship.

It should be understood that, in the various embodiments of the present disclosure, the sequence numbers of the foregoing processes or steps do not mean the order of the processes or steps, and the order of the processes or steps should be determined by their functions and internal logic, and should not impose any undue limitations on the implementations of the present disclosure.

Persons skilled in the art will realize that the various steps of the method and elements described in connection with the embodiments disclosed herein can be implemented in electronic hardware, computer software, or a combination of both. In order to clearly illustrate interchangeability of hardware and software, the steps and components of the embodiments have been generally described in terms of functions in the mentioned description. Whether these functions are implemented in hardware or software depending on the specific application and design constraints of the solutions. A person skilled in the art can use different methods for implementing the described functions for each particular application, but such implementation should not be considered to be beyond the scope of the present disclosure.

The methods or steps described in connection with the embodiments disclosed herein may be implemented in hardware, a software program executed by a processor, or a combination of both. The software program can be placed in a random access memory (RAM), a memory, a read-only memory (ROM), an electrically programmable read-only memory (EPROM), an electrically erasable Electrically Erasable Programmable Read-Only Memory (EEPROM), a register, a hard disk, a portable magnetic disk, a Compact Disc Read-Only Memory (CD-ROM), or any other forms of storage medium known in this art.

In the embodiments provided by the present disclosure, it should be understood that the disclosed systems, devices, and methods may be implemented in other manners. For example, the device embodiments described above are merely illustrative. For example, the division of the units is only a logical function division. In actual implementation, there may be another division manner, for example, multiple units or components may be combined or may be integrated into another system, or some features can be ignored or not executed.

The units described as separate components may be or may not be physically separated, and the components shown as units may be or may not be physical units, that is, they may be located in one place, or may be distributed over multiple network units. Some or all of the units may be selected according to actual needs to achieve the purpose of the solutions provided by embodiments of the present disclosure.

In addition, each functional unit in each embodiment of the present invention may be integrated into one processing unit, or each unit may exist physically and separately, or two or more units may be integrated into one unit.

Although the present disclosure has been described in detail with reference to the accompanying drawings, various equivalent modifications and substitutions to the embodiments of the present disclosure may be made by persons skilled in the art without departing from the spirit and scope of the present disclosure, and such modifications and substitutions fall within the scope of the present disclosure.

What is claimed is:

1. A handover method, comprising:
receiving, by a source network device, a measurement signal transmitted by a terminal device, the measurement signal being used for the source network device to determine an uplink signal quality of the terminal device; and
determining, by the source network device, whether a handover from a serving cell to a target cell is needed for the terminal device according to the measurement signal;
wherein the method further comprises:
obtaining, by the source network device, information relevant to the measurement signal, wherein the information relevant to the measurement signal is used for indicating information of parameters corresponding to the measurement signal;
wherein determining, by the source network device, whether the handover is needed for the terminal device according to the measurement signal, comprises:
determining, by the source network device, whether the handover is needed for the terminal device according to the measurement signal and the information relevant to the measurement signal;
wherein obtaining, by the source network device, information relevant to the measurement signal, comprises:
receiving, by the source network device, the information relevant to the measurement signal transmitted by the terminal device;
wherein the information relevant to the measurement signal comprises transmitting power information which is used for determining, by the source network device, transmitting power of the measurement signal according to the transmitting power information, and the transmitting power information comprises at least one of an absolute value of the transmitting power of the measurement signal and a transmitting power headroom of the terminal device;
wherein obtaining, by the source network device, the transmitting power information, comprises:
receiving, by the source network device, uplink information which is transmitted by the terminal device via an uplink control channel (PUCCH), wherein the uplink information comprises a transmitting power index value used for indicating the transmitting power information; and
determining at least one of the absolute value of the transmitting power of the measurement signal and the transmitting power headroom of the terminal device, according to a correspondence between transmitting power index values and at least one of absolute values of the transmitting power and transmitting power headroom.

2. The method according to claim 1, wherein determining, by the source network device, whether the handover is needed for the terminal device according to the measurement signal and the information relevant to the measurement signal, comprises one of the following:
determining, by the source network device, signal quality of an uplink signal according to the measurement signal and the information relevant to the measurement signal;
determining, by the source network device, whether the handover is needed for the terminal device according to the signal quality; and
determining, by the source network device, whether the handover is needed for the terminal device according to the signal quality and performance of a downlink channel.

3. The method according to claim 1, wherein before receiving, by the source network device, the measurement signal transmitted by the terminal device, the method further comprises:
transmitting, by the source network device, to the terminal device at least one of an initial transmitting power, an index value of a transmitting power, a correspondence between a measurement signal or a measurement signal mode and a transmitting power or a transmitting power level of the measurement signal, and a correspondence between transmitting power information and a reserved information bit of uplink information.

4. The method according to claim 1, further comprising:
transmitting, by the source network device, control information to the terminal device, wherein the control information is used for indicating whether the terminal device transmits the measurement signal and/or the information relevant to the measurement signal to the source network device.

5. The method according to claim 1, wherein the serving cell and the target cell belong to the source network device.

6. A source network device, comprising:
a transceiver configured to receive a measurement signal transmitted by a terminal device, the measurement signal being used for the source network device to determine an uplink signal quality of the terminal device; and
a processor configured to:
determine whether a handover from a serving cell to a target cell is needed for the terminal device according to the measurement signal;
wherein the processor is further configured to obtain information relevant to the measurement signal, wherein the information relevant to the measurement signal is used for indicating information of parameters corresponding to the measurement signal;
wherein the processor is configured to determine whether the handover is needed for the terminal device according to the measurement signal and the information relevant to the measurement signal;
wherein the transceiver is further configured to receive information relevant to the measurement signal transmitted by the terminal device;
wherein the information relevant to the measurement signal comprises transmitting power information which is used for determining, by the source network device, transmitting power of the measurement signal according to the transmitting power information, and the transmitting power information comprises at least one of an absolute value of the transmitting power of the measurement signal and a transmitting power headroom of the terminal device;

wherein the processor is further configured to:
  receive uplink information which is transmitted by the terminal device via an uplink control channel (PUCCH), wherein the uplink information comprises a transmitting power index value used for indicating the transmitting power information; and
  determine at least one of the absolute value of the transmitting power of the measurement signal and the transmitting power headroom of the terminal device, according to a correspondence between transmitting power index values and at least one of absolute values of the transmitting power and transmitting power headroom.

7. The source network device according to claim 6, wherein the processor is configured to perform one of the following:
  determine signal quality of an uplink signal according to the measurement signal and the information relevant to the measurement signal;
  determine whether the handover is needed for the terminal device according to the signal quality; and
  determine whether the handover is needed for the terminal device according to the signal quality and performance of a downlink channel.

8. The source network device according to claim 6, wherein the transceiver is further configured to:
  before the transceiver receives the measurement signal transmitted by the terminal device, transmit to the terminal device at least one of an initial transmitting power, an index value of a transmitting power, a correspondence between a measurement signal or a measurement signal mode and a transmitting power or a transmitting power level of the measurement signal, and a correspondence between transmitting power information and a reserved information bit of uplink information.

9. The source network device according to claim 6, wherein the transceiver is further configured to:
  transmit control information to the terminal device, wherein the control information is used for indicating whether the terminal device transmits the measurement signal and/or the information relevant to the measurement signal to the source network device.

10. The source network device according to claim 6, wherein the serving cell and the target cell belong to the source network device.

* * * * *